US008785828B2

(12) United States Patent
Komuro

(10) Patent No.: US 8,785,828 B2
(45) Date of Patent: Jul. 22, 2014

(54) COOKING DEVICE

(75) Inventor: Yoneo Komuro, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 344 days.

(21) Appl. No.: 13/266,387

(22) PCT Filed: Apr. 27, 2010

(86) PCT No.: PCT/JP2010/057450
§ 371 (c)(1), (2), (4) Date: Oct. 26, 2011

(87) PCT Pub. No.: WO2010/126037
PCT Pub. Date: Nov. 4, 2010

(65) Prior Publication Data

US 2012/0043318 A1 Feb. 23, 2012

(30) Foreign Application Priority Data

Apr. 28, 2009 (JP) ................................. 2009-109761

(51) Int. Cl.
*H05B 6/64* (2006.01)
*A21B 1/00* (2006.01)
*A21B 1/22* (2006.01)

(52) U.S. Cl.
USPC ............................ 219/757; 219/401; 219/682

(58) Field of Classification Search
USPC ......... 219/385, 391, 396, 399–401, 402, 682, 219/757; 99/331, 473–474
See application file for complete search history.

(56) References Cited

U.S. PATENT DOCUMENTS

2010/0064902 A1 3/2010 Sakane et al.

FOREIGN PATENT DOCUMENTS

| | | | | |
|---|---|---|---|---|
| EP | 1 640 666 | A1 | | 3/2006 |
| JP | 60-050319 | A | | 3/1985 |
| JP | 9-273759 | A | | 10/1997 |
| JP | 2005-003317 | A | | 1/2005 |
| JP | 2008-032286 | A | | 2/2008 |
| JP | 2008-051360 | A | | 3/2008 |
| JP | 2008051360 | A | * | 3/2008 |
| JP | 2008-116094 | A | | 5/2008 |

OTHER PUBLICATIONS

International Search Report, PCT/JP2010/057450, Jun. 22, 2010.

* cited by examiner

*Primary Examiner* — Tu B Hoang
*Assistant Examiner* — Michael Hoang
(74) *Attorney, Agent, or Firm* — Birch, Stewart, Kolasch & Birch, LLP

(57) ABSTRACT

A cooking device comprises: a body casing (1); a heating chamber (2) disposed within the body casing (1) and provided with a gas discharge opening; a gas discharge path having one end connected to the gas discharge opening of the heating chamber; a cooling fan disposed within the body casing (1) and cooling an electric component; and a cooling path formed within the body casing (1) and leading from an outside-air suction opening (100) through the cooling fan and an electric component chamber to a cool-air introducing opening (31*a*) in a gas discharge duct (30). At least a part of cooling air from the cooling fan flows along the cooling path, passes through a space near heaters (14, 14) within the body casing (1), enters the gas discharge duct (30) from the cool-air introducing opening (31*a*), and is discharged from a gas-discharge external opening (28).

3 Claims, 9 Drawing Sheets

COOKING DEVICE

TECHNICAL FIELD

The present invention relates to a cooking device.

BACKGROUND ART

There has been a conventional cooking device having a discharge gas diluting device that discharges diluted discharge gas to outside with use of an ejector effect by which discharge gas from a heating chamber is drawn by a pressure difference with respect to a forced flow from a multi blade fan (see JP 2008-116094 A (PTL 1), for instance).

The cooking device, however, has a problem in that use of the multi blade fan makes the cooking device structure complicated and increases its costs.

CITATION LIST

Patent Literature

PTL1: JP 2008-116094 A

SUMMARY OF INVENTION

Technical Problem

An object of the invention is to provide a cooking device that is capable of diluting discharge gas by a simple structure and with a low cost, without use of a separate gas discharge fan for dilution.

Solution to Problem

In order to achieve the above object, there is provided a cooking device comprising:

a main body casing, a heating chamber which is provided in the main body casing and on which an internal gas discharge opening is provided, a gas discharge path which has one end connected to the internal gas discharge opening on the heating chamber and the other end connected to an external gas discharge opening and in which a cooling path terminal opening is provided on upstream side of the external gas discharge opening, an electric component chamber which is provided in the main body casing, a cooling fan which is provided in the main body casing and which is intended for cooling electric components in the electric component chamber, an outside-air intake which is provided on the main body casing and through which outside air is taken in, cooling paths which are formed in the main body casing and which extend from the outside-air intake through the cooling fan and the electric component chamber to the cooling path terminal opening, and heaters which are provided in the main body casing and which are intended for heating inside of the heating chamber, wherein at least a portion of cooling air from the cooling fan flows along the cooling paths, passes through spaces in vicinity of the heaters in the main body casing, flows into the gas discharge path through the cooling path terminal opening, and is discharged through the external gas discharge opening.

According to the above configuration, at least a portion of the cooling air from the cooling fan that is provided in the main body casing flows along the cooling paths, passes through the spaces in vicinity of the heaters in the main body casing, flows into the gas discharge path through the cooling path terminal opening on the gas discharge path, and is discharged. Then gas containing steam (only steam in general in oxygen-free cooking with use of superheated steam or the like) from the gas discharge opening of the heating chamber provided in the main body casing is discharged to the outside by being carried by a flow of the cooling air that has flowed from the cooling paths into the gas discharge path. Then the cooling air is heated by passing by the heaters, humidity of the cooling air is thereby decreased relative to humidity of the discharge gas from the heating chamber, the humidity of the discharge gas is thus decreased when the cooling air is merged and mixed with the discharge gas from the heating chamber, and condensation on surroundings is effectively prevented when the gas is discharged out of the main body casing. Thus the discharge gas can be diluted by a simple structure and with a low cost, without use of a separate gas discharge fan for dilution. In addition, elimination of necessity of a space for placement of the gas discharge fan is advantageous for size reduction.

In one embodiment of the invention, the cooling fan and the gas discharge path are placed in the main body casing so as to be opposed to each other.

According to the embodiment, the cooling fan and the gas discharge path that are placed in the main body casing so as to be generally opposed to each other facilitate formation of the flow in which the cooling air from the cooling fan passes through the cooling paths while cooling the electric components in the main body casing and goes toward the generally opposed gas discharge path in the main body casing before flowing into the gas discharge path, and make it possible to smoothly perform the cooling of the electric components and the gas discharge.

In one embodiment of the invention, a second cooling path having a blow-off opening through which a portion of the cooling air from the cooling fan is blown off is provided in vicinity of the external gas discharge opening of the gas discharge path.

According to the embodiment, the second cooling path having the blow-off opening through which a portion of the cooling air from the cooling fan is blown off is provided in vicinity of the external gas discharge opening of the gas discharge path, the cooling air is therefore blown off from the blow-off opening of the second cooling path along the discharge gas blowing off from the external gas discharge opening of the gas discharge path, and thus occurrence of condensation can be prevented on outer surfaces of the main body casing in vicinity of the external gas discharge opening, wall surfaces on upper side of the external gas discharge opening and the like, particularly in steam cooking in which a great quantity of steam is discharged.

In one embodiment of the invention, the cooking device further comprises heater chambers which are provided on top side of the heating chamber and in which the heaters for heating the inside of the heating chamber are housed, wherein the cooling air from the cooling fan flows through the top side of the heating chamber along the heater chambers and flows into the gas discharge path.

According to the embodiment, the cooling air from the cooling fan flows through the top side of the heating chamber along the heater chamber in which the heaters for heating the inside of the heating chamber are housed and flows into the gas discharge path, and thus outside of the heater chamber can efficiently be cooled so that increase in temperature on the top face side of the main body casing can be suppressed.

In one embodiment of the invention, the cooling air from the cooling fan flows along at least one side face of the heating chamber after passing through the electric component chamber and flows into the gas discharge path.

According to the embodiment, the cooling air from the cooling fan passes through the electric component chamber in which the electric components are placed, thereafter flows along at least one side face of the heating chamber, and flows into the gas discharge path, so as to initially cool the electric components in the electric component chamber and so as to thereafter flow along at least the one side face of the heating chamber, and thus the electric components can be cooled by the cooling air that is not yet increased in temperature by heat from the heating chamber, so that increase in cooling effect improves reliability.

Advantageous Effects of Invention

According to the cooking device of the invention, as apparent from above, the cooking device can be obtained that is capable of diluting the discharge gas by a simple structure and with a low cost, without use of a separate gas discharge fan for dilution.

DESCRIPTION OF EMBODIMENTS

Figure 1:
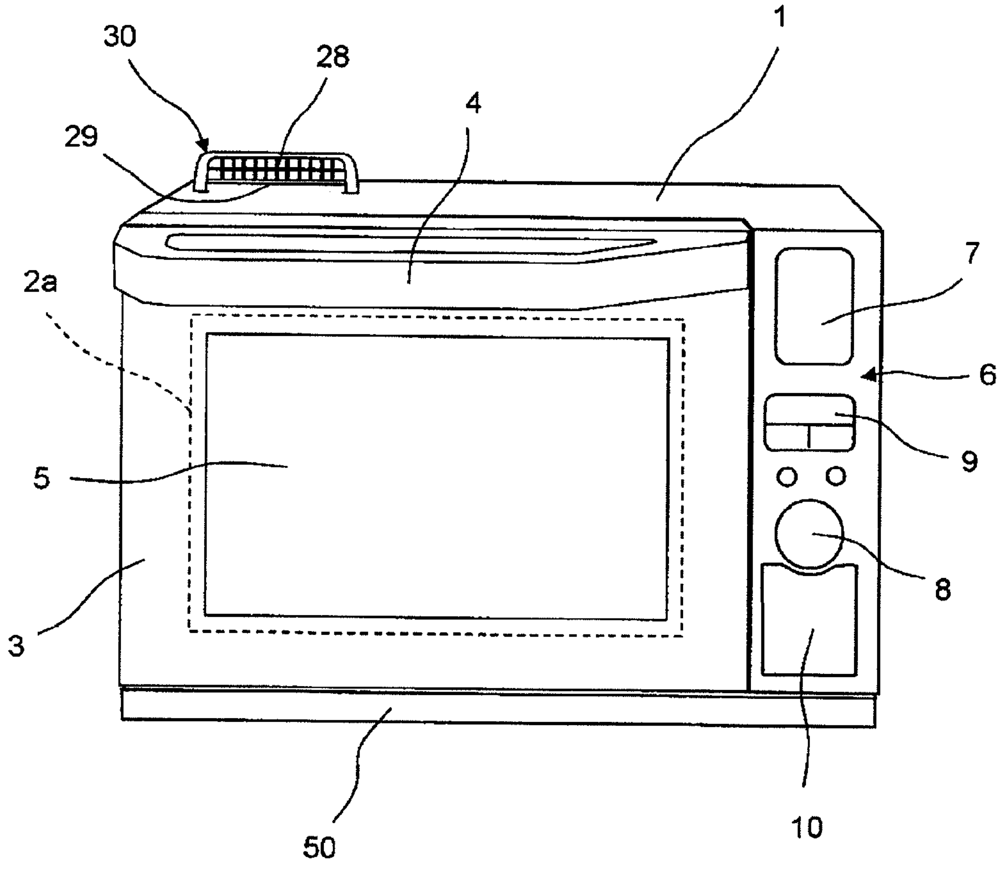
FIG. 1 is a front view of a cooking device in accordance with an embodiment of the invention, as viewed from front face side thereof.

Hereinbelow, a cooking device of the invention will be described in detail with reference to an embodiment shown in the drawings.

Figure 2:
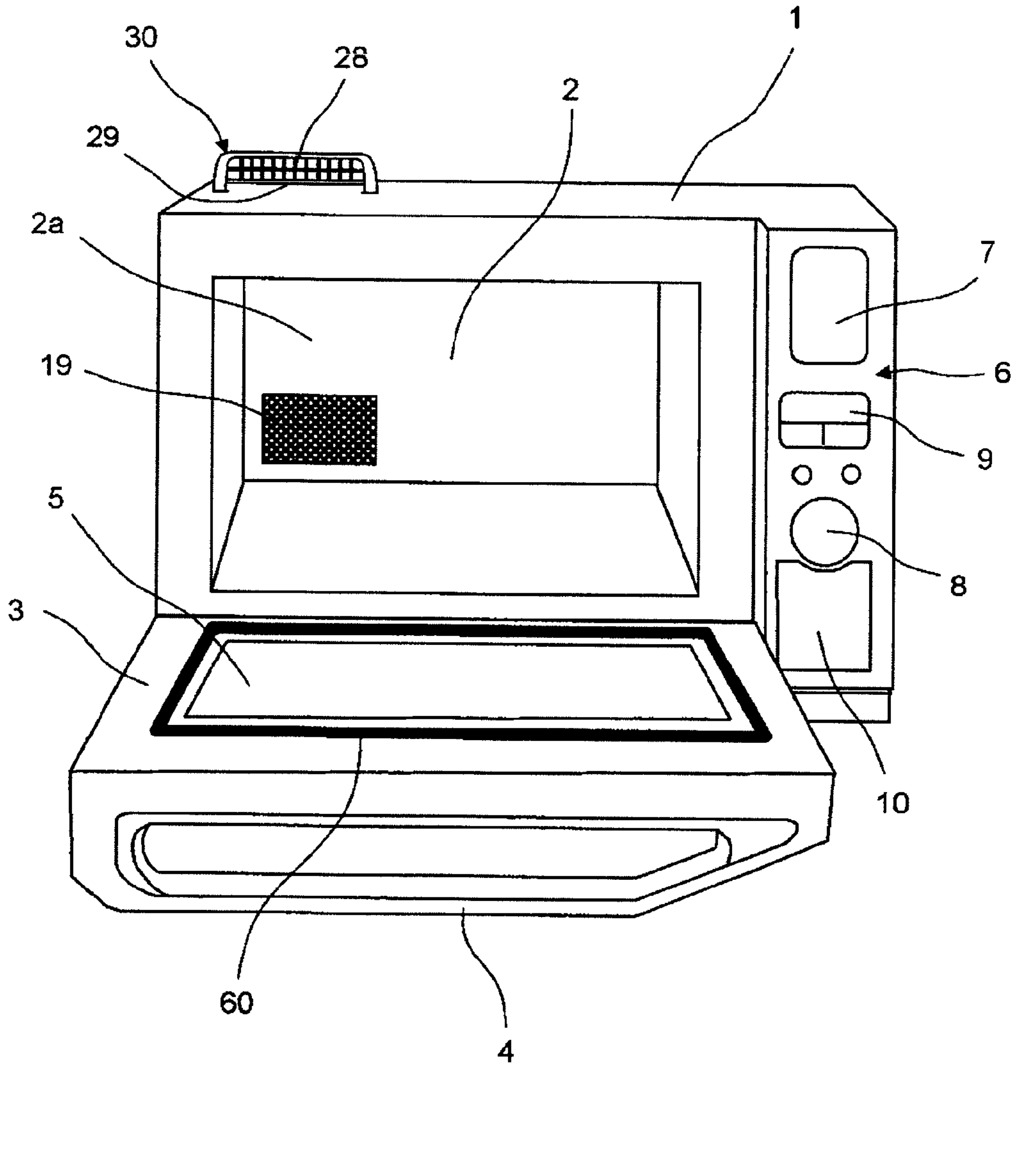
FIG. 2 is a front view of the cooking device with a door opened.

FIG. 1 shows a front view of a cooking device in accordance with the embodiment of the invention, as viewed from front face side thereof, and FIG. 2 shows a front view of the cooking device with a door opened.

As shown in FIG. 1, the cooking device in accordance with the embodiment has a main body casing 1 that is shaped like a rectangular parallelepiped, a heating chamber 2 (shown in FIG. 2) that is provided in the main body casing 1, and a door 3 that is pivotably mounted on the front face side of the main body casing 1.

The door 3 pivots on a lower end part thereof so as to open and close an opening 2*a* of the heating chamber 2. A handle 4 is mounted on upper part of the door 3. Heat-resistant glass 5 is provided generally at center part of the door 3, so that a user can observe a state of inside of the heating chamber 2 through the heat-resistant glass 5. Onto a rear face of the door 3, packing 60 (shown in FIG. 2) made of heat-resistant resin is fixed so as to surround the heat-resistant glass 5. The packing 60 is brought into intense and intimate contact with peripheral part of the opening 2*a* of the heating chamber 2 when the door 3 is closed. Thus steam and/or the like in the heating chamber 2 can be prevented from leaking out from between the door 3 and the peripheral part of the opening 2*a* of the heating chamber 2.

On top face and back face side of the main body casing 1, a gas discharge duct 30 in which an external gas discharge opening 28 and a blow-off opening 29 are provided so as to form two upper and lower levels is provided as an example of a gas discharge path. One end of the gas discharge duct 30 is connected to an opening on a protruding part 33 (shown in FIGS. 5 and 6) communicating with an internal gas discharge opening 19 that is shown in FIG. 2 and that is provided on back face side of the heating chamber 2.

An operation panel 6 is provided on right side on the front face of the main body casing 1. The operation panel 6 has a liquid crystal display part 7, a dial 8, and a plurality of buttons 9. A water supply tank 10 is housed under the dial 8. The water supply tank 10 can be attached to and detached from the main body casing 1 through the front face side of the main body casing 1.

The cooking device has a drip receiving container (shown in FIG. 1) that is detachably mounted on underside and the front face side of the main body casing 1 and that receives water droplets dropping along the inner face of the door 3 and the front face of the main body casing 1.

Figure 3:
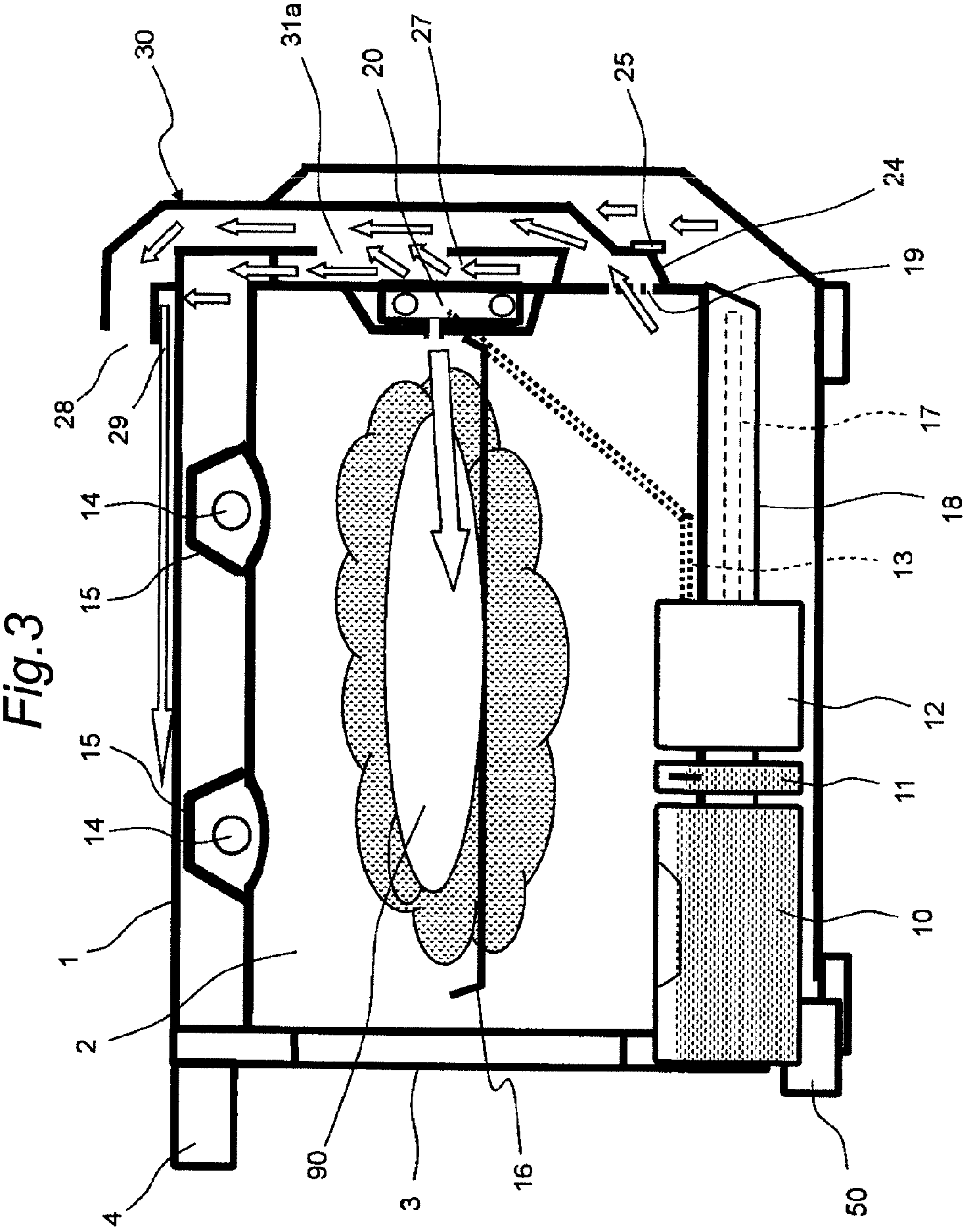
FIG. 3 is a schematic vertical section of the cooking device as viewed from right side thereof.

FIG. 3 is a schematic vertical section of the cooking device as viewed from right side thereof, and the same components therein as those in FIGS. 1 and 2 are provided with the same reference numerals. In FIG. 3, reference numeral 11 denotes a water level sensor, numeral 12 denotes a water supply pump, numeral 13 denotes a water supply pipe, numeral 14, 14 denote upper heaters, numeral 15, 15 denote upper heater covers that form heater chambers for housing the upper heaters 14, 14, numeral 16 denotes a tray on which an object 90 to be cooked is to be put, numeral 17 denotes a lower heater, numeral 18 denotes a heat shield plate, numeral 19 denotes the gas discharge opening, numeral 20 denotes a steam producing device, numeral 24 denotes a gas discharge opening cover, numeral denotes a discharge gas thermo-sensor, numeral 27 denotes a cool-air path, numeral 28 denotes the external gas discharge opening, numeral 29 denotes the blow-off opening, numeral 30 denotes a gas discharge duct, numeral 31*a* denotes a cool-air introducing opening, as an example of a cooling path terminal opening, provided in the gas discharge duct 30, and numeral 50 denotes the drip receiving container. Though not shown, a magnetron for producing microwaves is also provided in the main body casing 1. The cooling path terminal opening is not limited to the cool-air introducing opening 31*a* but has only to be provided on upstream side of the external gas discharge opening on the gas discharge path.

The water supply pump 12 takes in water in the water supply tank 10 and supplies the water through the water supply pipe 13 to the steam producing device 20. The steam producing device 20 is capable of producing steam by heating the water from the water supply pump 12 and supplying the produced steam into the heating chamber 2, and capable of producing superheated steam by superheating the steam and supplying the superheated steam into the heating chamber 2.

Herein, above-mentioned superheated steam refers to steam heated to a superheated state with temperatures not lower than 100° C.

The object to be cooked 90 can be heated by the steam or the superheated steam from the steam producing device 20 and/or can be heated by radiant heat from the upper heaters 14 and the lower heater 17. A ceiling wall of the heating chamber 2 is provided under the upper heaters 14 and a bottom wall of the heating chamber 2 is provided above the lower heater 17. The upper heaters 14 and the lower heater 17 are not exposed in the heating chamber 2.

Figure 4:
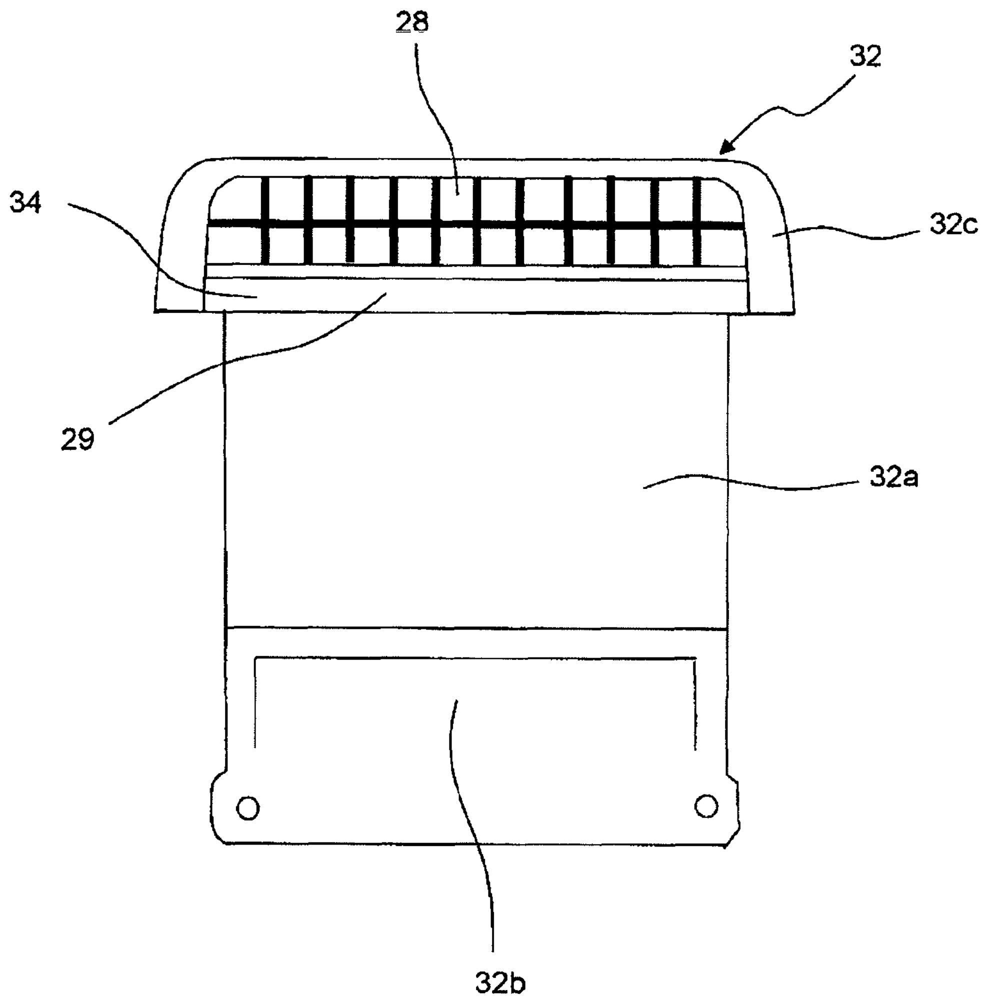
FIG. 4 is a front view of a second gas discharge duct part of the cooking device.

FIG. 4 shows a front view of a second gas discharge duct part 32 of the cooking device. The second gas discharge duct part 32 is upper part of the gas discharge duct 30 shown in FIGS. 1 and 2. As shown in FIG. 4, the second gas discharge duct part 32 has a sleeve part 32*a* that includes an insertion opening 32*b* on lower side thereof and that has a rectangular section, and has a bent part 32*c* that extends forward from an upper end of the sleeve part 32*a*. The external gas discharge opening 28 and the blow-off opening 29 are provided at an extremity of the bent part 32*c* of the second gas discharge duct part 32. The external gas discharge opening 28 communicates with the sleeve part 32*a* through a path formed on upper side of the bent part 32*c*. The blow-off opening 29 forms a second cooling path 34 through which cooling air flows, under the path on the upper side of the bent part 32*c*.

Figure 5:
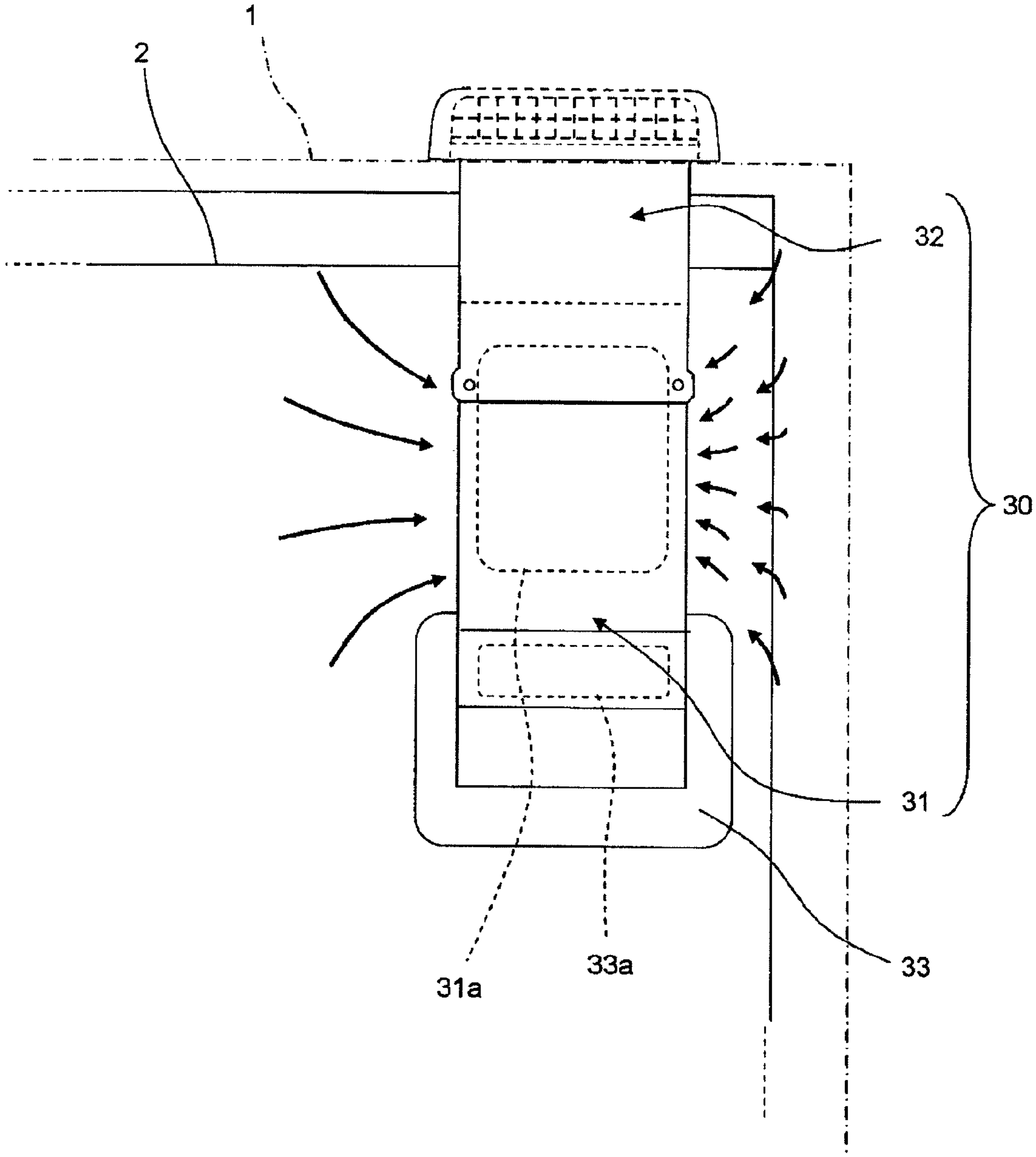
FIG. 5 is a rear view of an important part of the cooking device.

FIG. 5 shows a rear view of an important part of the cooking device, and the same components therein as those shown in FIGS. 1 and 2 are provided with the same reference numerals.

As shown in FIG. 5, the protruding part 33 that protrudes outward toward the back face side is provided in a position corresponding to the internal gas discharge opening 19 (shown in FIG. 2) provided on the back face of the heating chamber 2. An inner space in the protruding part 33 communicates with the inside of the heating chamber 2 through the internal gas discharge opening 19. A hole 33*a* that is generally rectangular is provided on upper side on the protruding part 33 of the heating chamber 2. A lower end of a first gas discharge duct part 31 that has a rectangular section is connected to the hole 33*a* on the protruding part 33, and an upper end of the first gas discharge duct part 31 is inserted into and fixed to the insertion opening 32*b* (shown in FIG. 4) of the second gas discharge duct part 32. The gas discharge duct 30 is composed of the first gas discharge duct part 31 and the second gas discharge duct part 32. The cool-air introducing opening 31*a* is provided on a side facing the heating chamber 2 on the first gas discharge duct part 31.

Steam discharged from the inside of the heating chamber 2 through the internal gas discharge opening 19 in cooking by steam enters the inner space in the protruding part 33, thereafter enters the first gas discharge duct part 31 through the hole 33*a* on the protruding part 33, and is discharged through the second gas discharge duct part 32 from the external gas discharge opening 28 (shown in FIG. 4). Then cooling air flows into the first gas discharge duct part 31 through the cool-air introducing opening 31*a* on the first gas discharge duct part 31.

Figure 6:
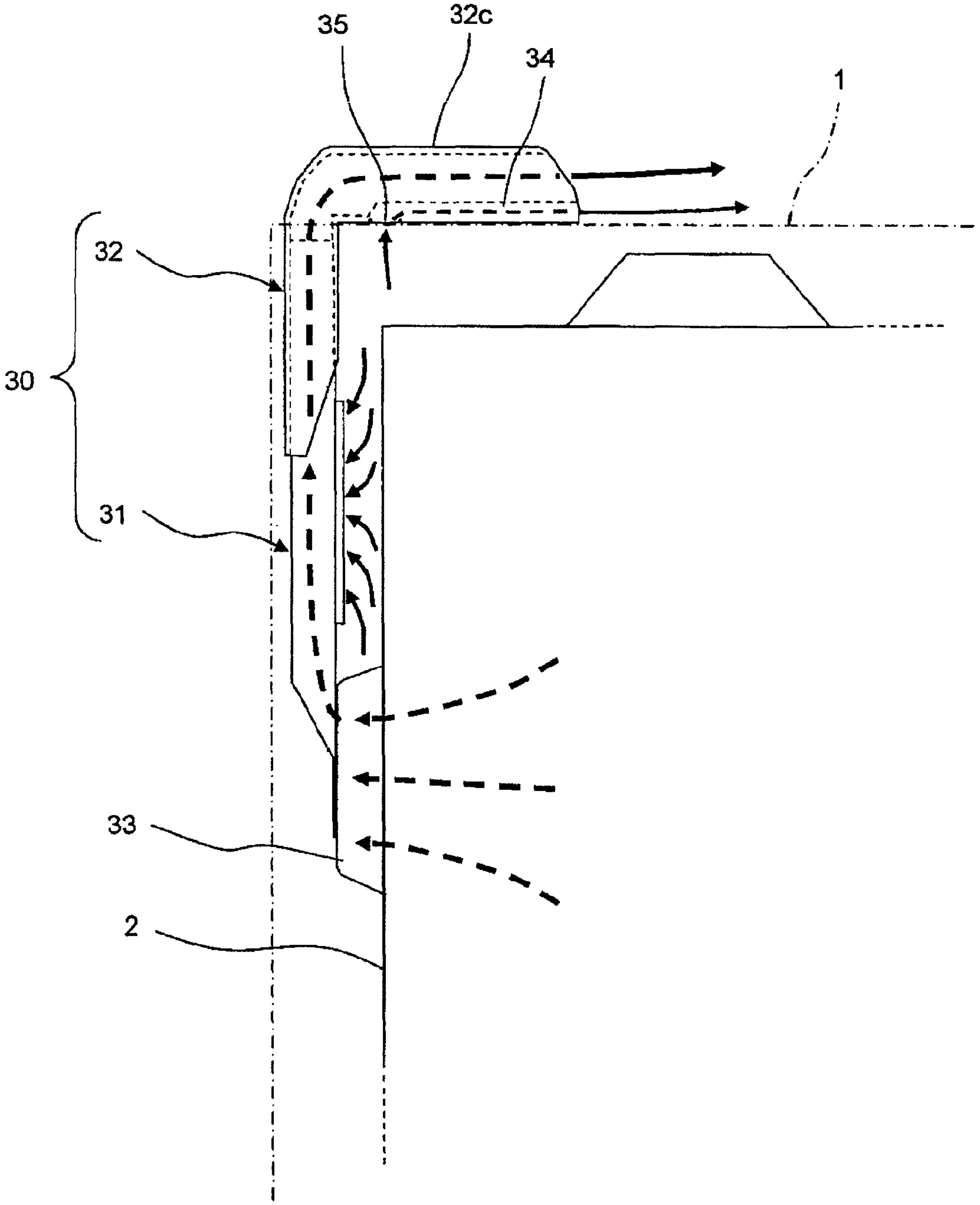
FIG. 6 is a side view of the important part of the cooking device.

FIG. 6 shows a side view of the important part of the cooking device, and the same components therein as those shown in FIGS. 1 and 2 are provided with the same reference numerals.

As shown in FIG. 6, the bent part 32*c* of the second gas discharge duct part 32 extends forward along the top face of the main body casing 1.

Figure 7:
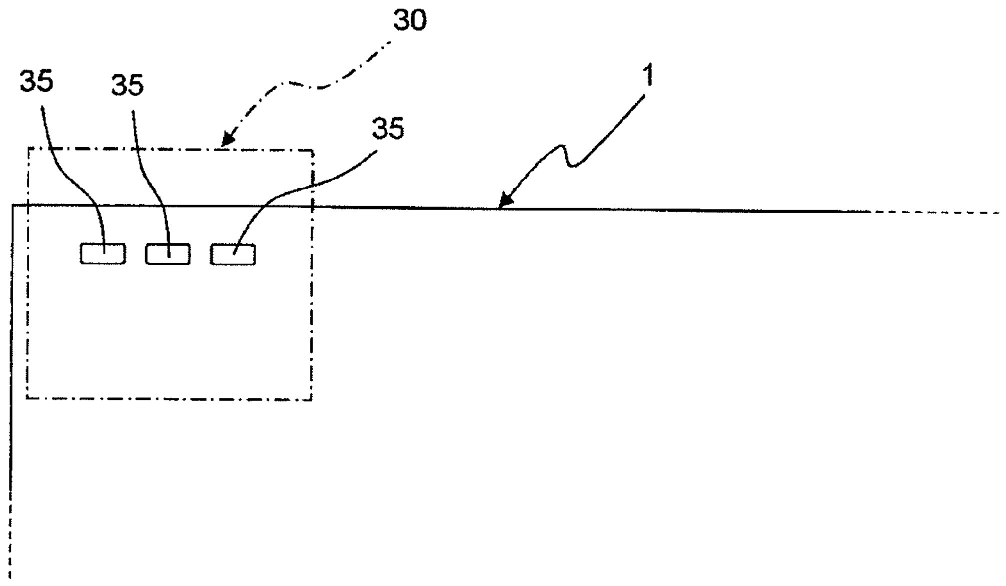
FIG. 7 is a top plan view of the important part of the cooking device.

FIG. 7 shows a top plan view of the important part of the cooking device, and the same components therein as those shown in FIGS. 1 and 2 are provided with the same reference numerals. Three slots 35 communicating with the second cooling path 34 (shown in FIG. 6) in the gas discharge duct 30 are provided on the main body casing 1 under the gas discharge duct 30 (the bent part 32*c* of the second gas discharge duct part 32) extending forward (downward in FIG. 7) along the top face of the main body casing 1. Shapes, positions, and the like of the slots may adequately be designed according to a configuration of the second cooling path.

Figure 8:
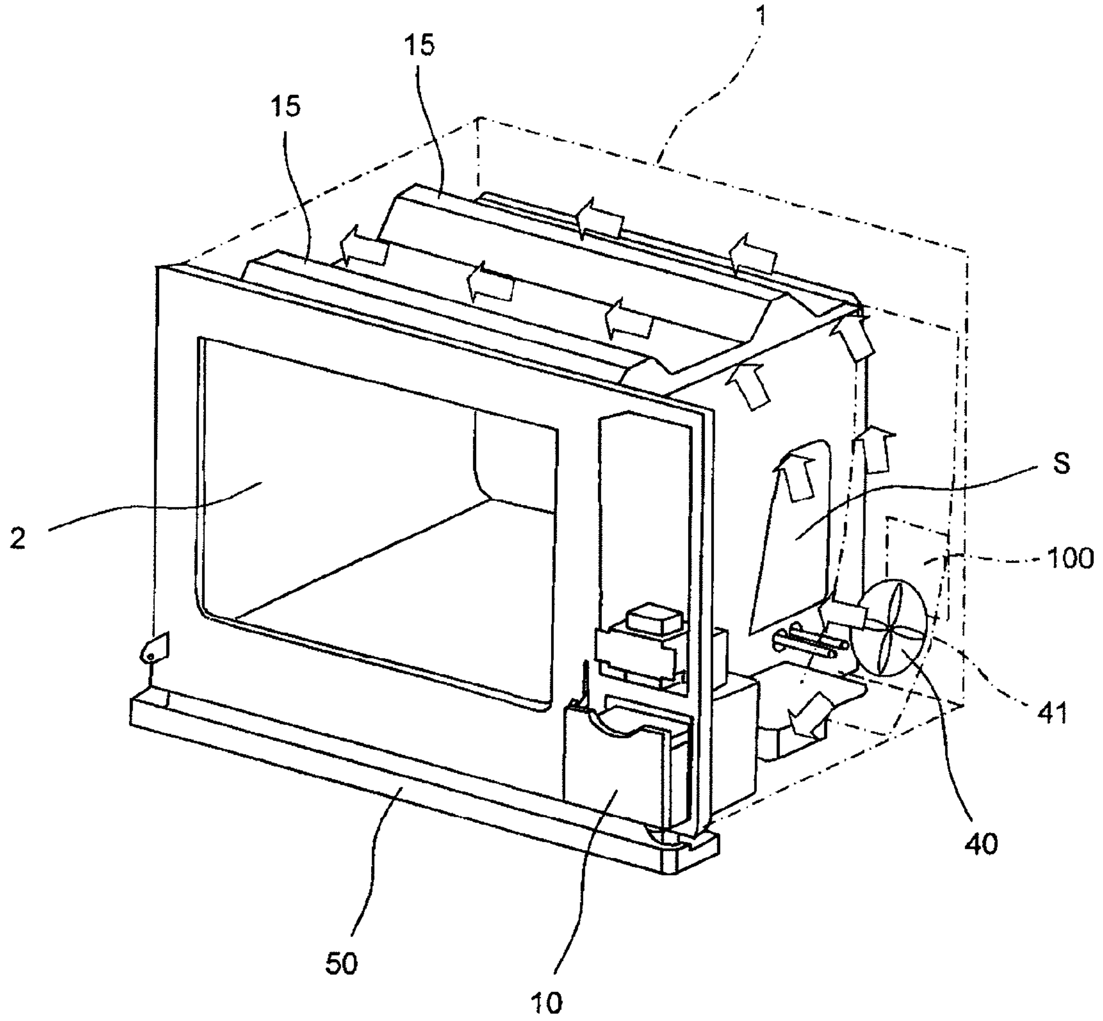
FIG. 8 is a perspective view of front face side of the cooking device, as viewed diagonally from above.
Figure 9:
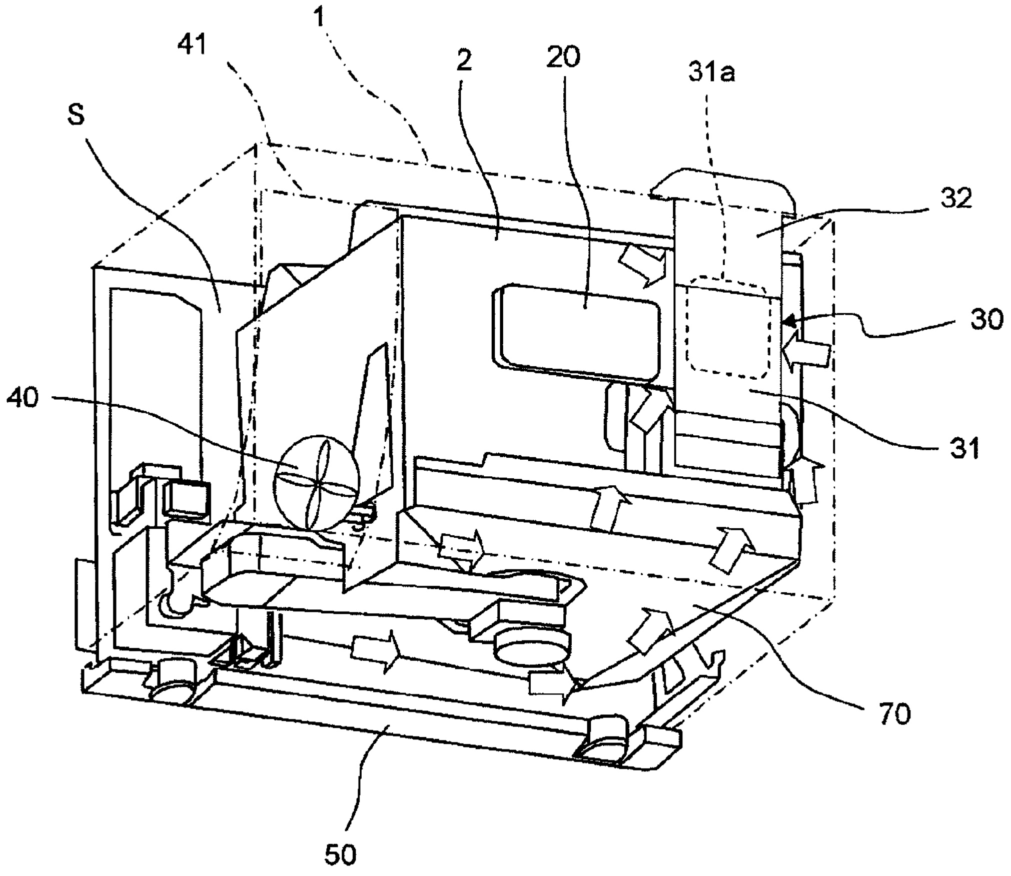
FIG. 9 is a perspective view of back face side of the cooking device, as viewed diagonally from below.

In the cooking device having the above configuration, cooling air from the cooling fan 40 passes through cooling paths shown in FIGS. 8 and 9, flows into the gas discharge duct 30, and is then discharged.

FIG. 8 shows a perspective view of the front face side of the cooking device, as viewed diagonally from above, and the same components therein as those shown in FIGS. 1 and 2 are provided with the same reference numerals.

As shown in FIG. 8, an electric component chamber S in which electric components are placed is formed at right of the heating chamber 2 placed in the main body casing 1. Back face side of the electric component chamber S is partitioned with a partition plate 41. The cooling fan 40 for delivering cooling air from the back face side into the electric component chamber S is placed under the partition plate 41. An outside-air intake 100 is provided behind the cooling fan 40 on the main body casing 1, so that outside air is taken in by the cooling fan 40 through the outside-air intake 100 and is blown off as the cooling air from the cooling fan 40. A portion of the cooling air from the cooling fan 40 passes through right side surface side of the heating chamber 2 while cooling the electric components in the electric component chamber S, and flows through the top face side of the heating chamber 2 toward left side along the upper heater covers 15, 15. On the other hand, another portion of the cooling air from the cooling fan 40 flows to lower right side of the heating chamber 2 while cooling the electric components in the electric component chamber S, and flows through the bottom face side of the heating chamber 2 toward the left side. The outside-air intake 100 is provided on the rear face side of the main body casing 1 and the cooling fan 40, whereas outside-air intake openings may appropriately be provided on other sites such as the bottom face and the back face of the main body casing. In the main body casing, the cooling paths are formed that extend from the outside-air intake 100 through the cooling fan 40 and the electric component chamber S to the cool-air introducing opening 31*a* of the gas discharge duct 30.

FIG. 9 shows a perspective view of back face side of the cooking device, as viewed diagonally from below, and the same components therein as those shown in FIGS. 1 and 2 are provided with the same reference numerals. In FIG. 9, the steam producing device 20 is placed at center of the back face side of the heating chamber 2, and the gas discharge duct 30 is placed at left (right side in FIG. 9) thereof.

In the main body casing 1, as shown in FIG. 9, the portion of the cooling air delivered from the cooling fan 40 into the electric component chamber S flows through the bottom face side of the heating chamber 2 toward the left side (right side in FIG. 9) and the back face side of the heating chamber 2 while cooling the electric components in the electric component chamber S, and passes through the back face side or the left side face side (right side in FIG. 9) of the heating chamber 2, and the cooling air flows into the first gas discharge duct part 31 through the cool-air introducing opening 31*a* on the first gas discharge duct part 31.

In the embodiment, the cooling paths of the cooking device have a route from the electric component chamber S through the top face side and the left side face side of the heating chamber 2 to the cool-air introducing opening 31*a* on the first gas discharge duct part 31 on the back face side, a route from the electric component chamber S through the bottom face side and the left side face side of the heating chamber 2 to the cool-air introducing opening 31*a* on the first gas discharge duct part 31 on the back face side, and a route from the electric component chamber S through the bottom face side and the back face side of the heating chamber 2 to the cool-air introducing opening 31*a* on the first gas discharge duct part 31. Not all the cooling air delivered from the cooling fan 40 into the electric component chamber S is discharged from the gas discharge duct 30 through the cool-air introducing opening 31*a* on the first gas discharge duct part 31 but a portion of the cooling air is discharged to the outside through other opening parts on the main body casing 1.

In FIG. 9, a heat shield plate 70 that intercepts heat from the heating chamber 2, that receives condensate water deposited on surfaces of the heating chamber 2, and that guides the condensate water into the drip receiving container 50 is provided on the bottom face side of the heating chamber 2. In the main body casing 1, accordingly, a portion of the cooling air delivered from the cooling fan 40 into the electric component chamber S passes through the bottom face side of the heating chamber 2 via a route through underside of the heat shield plate 70 and a route through between the bottom face of the heating chamber 2 and the heat shield plate 70.

For the cooking device, structures in the main body casing 1 are designed so that air flow through the cooling paths, that is, the air routes by which the cooling air flows into the gas discharge duct 30 are ensured. In addition, the structures in the main body casing 1 are designed so that air flow through the second cooling path 34, that is, an air route by which the cooling air is blown off from the blow-off opening 29 through the three slots 35 provided on the main body casing 1 and the second cooling path 34 in the gas discharge duct 30 is ensured.

When the cooling air from the cooling fan 40 provided in the main body casing 1 flows into the gas discharge duct 30 through the cooling paths running through the bottom face side, the top face side, the left side face side, the right side face side, and the back face side of the heating chamber 2 and is discharged, in the cooking device having the above configuration, gas containing steam, from the internal gas discharge opening 19 of the heating chamber 2 provided in the main body casing 1, is carried by a flow of the cooling air that has flowed from the cooling paths into the gas discharge duct 30 and discharged to the outside. Then the cooling air is heated by passing near the heaters 14, 14, humidity of the cooling air is thereby decreased relative to humidity of the discharge gas from the heating chamber 2, the humidity of the discharge gas is thus decreased when the cooling air is merged and mixed with the discharge gas from the heating chamber 2, and condensation on surroundings is effectively prevented when the gas is discharged out of the main body casing 1. Thus the discharge gas can be diluted by the simple structure and with a low cost, without use of a separate gas discharge fan for dilution.

The gas flows into the gas discharge duct 30 through the cooling paths running through the bottom face side, the top face side, the left side face side, the right side face side, and the back face side of the heating chamber 2 and is discharged therefrom, in the embodiment, whereas the gas may be made to flow into the gas discharge duct 30 through cooling paths running through at least one side face of the heating chamber 2 and may be discharged therefrom. Herein, at least one side face of the heating chamber refers to at least one of the bottom face side, the top face side, the left side face side, the right side face side, and the back face side thereof except the front face side having the opening.

The placement of the cooling fan 40 and the gas discharge duct 30 in positions generally opposed to each other with the placement of the cooling fan 40 on lower right side in the main body casing 1 and the placement of the gas discharge duct 30 on upper left side in the main body casing 1 facilitates formation of the flow in which the cooling air from the cooling fan 40 passes through the cooling paths while cooling the electric components in the main body casing 1 and goes toward the generally opposed gas discharge duct 30 in the main body casing 1 before flowing into the gas discharge duct 30, and makes it possible to smoothly perform the cooling of the electric components and the gas discharge.

With the provision of the second cooling path 34 having the blow-off opening 29 in vicinity of the external gas discharge opening 28 of the gas discharge duct 30, the cooling air blows off from the blow-off opening 29 of the second cooling path 34 along the discharge gas blowing off from the external gas discharge opening 28 of the gas discharge duct 30 and thus occurrence of condensation is prevented on outer surfaces of the main body casing 1 in vicinity of the external gas discharge opening 28, wall surfaces on upper side of the external gas discharge opening 28 and the like, particularly in steam cooking in which a great quantity of steam is discharged. A position of the blow-off opening of the second cooling path is not limited thereto but may adequately be set according to a structure of the second cooling path.

The cooling air from the cooling fan 40 flows through the top side of the heating chamber 2 along the upper heater covers 15, 15 in which the upper heaters 14, for heating the inside of the heating chamber 2 are housed and flows into the gas discharge duct 30, and thus outside of the upper heater covers 15, 15 can efficiently be cooled so that increase in temperature on the top face side of the main body casing 1 can be suppressed.

The cooling air from the cooling fan 40 passes through the electric component chamber S in which the electric components are placed, thereafter flows along the bottom face, the top face, the left side face, the right side face, and the back face of the heating chamber 2, and flows into the gas discharge duct 30, so as to initially cool the electric components in the electric component chamber S and so as to thereafter flow along the bottom face, the top face, the left side face, the right side face, and the back face of the heating chamber 2, and thus the electric components can be cooled by the cooling air that is not yet increased in temperature by heat from the heating chamber 2, so that increase in cooling effect improves reliability.

The cooling air may be made to flow into the gas discharge duct 30 through cooling paths running through at least one side face of the heating chamber 2 and may be discharged therefrom.

The opening 2*a* of the heating chamber 2 is opened and closed by the door 3 of pivoting type in the embodiment, whereas the opening of the heating chamber may be opened and closed by a door that slides in to-and-fro directions relative to the main body casing 1, for instance. That is, the door which the cooking device of the invention includes may be of the pivoting type or of the slide type.

In the cooking device of the invention, healthy cooking can be performed by use of superheated steam or saturated steam in a microwave oven or an oven. In the cooking device of the invention, for instance, superheated steam or saturated steam having a temperature not lower than 100° C. is supplied onto surfaces of food, the superheated steam or saturated steam deposited onto the surfaces of the food condenses and gives the food a great quantity of latent heat of condensation, therefore heat can efficiently be transmitted to the food. The condensate water is deposited on the surfaces of the food, and salt content, oil content and the like drop with the condensate water, so that salt content, oil content and the like in the food can be reduced. Furthermore, the heating chamber is filled with the superheated steam or saturated steam so as to be absent from oxygen, and thus cooking by which oxidation of the food is suppressed can be performed.

The cooking device of the invention has the main body casing, the heating chamber which is provided in the main body casing and on which the gas discharge opening is provided, the gas discharge path having one end connected to the gas discharge opening on the heating chamber, the cooling fan which is provided in the main body casing and which is intended for cooling the electric components, and the cooling paths in which the cooling air from the cooling fan passes through at least one side face side of the heating chamber, flows into the gas discharge path, and is discharged, and is characterized in that no fans exist in the gas discharge path.

Herein, the phrase "at least one side face side of the heating chamber" refers to at least one of the bottom face side, the top face side, the left side face side, the right side face side, and the back face side, except the front face side having the opening.

In the above configuration, the cooling air from the cooling fan provided in the main body casing flows into the gas discharge path through the cooling paths that run through at least one side face side of the heating chamber, and is discharged therethrough. Then gas containing steam (only steam in general in oxygen-free cooking with use of superheated steam or the like) from the gas discharge opening of the heating chamber provided in the main body casing is carried by the flow of the cooling air that has flowed from the cooling paths into the gas discharge path and discharged to the outside. Thus the discharge gas can be diluted by the simple structure and with a low cost, without use of a separate gas discharge fan for dilution. In addition, elimination of necessity of a space for placement of the gas discharge fan is advantageous for size reduction.

REFERENCE SIGNS LIST

1 main body casing
2 heating chamber
2*a* opening
3 door
4 handle
5 heat-resistant glass
6 operation panel
7 liquid crystal display part
8 dial
9 button
10 water supply tank
14, 14 upper heater
15, 15 upper heater cover
19 internal gas discharge opening
20 steam producing device
28 external gas discharge opening
29 blow-off opening
30 gas discharge duct
31 first gas discharge duct part
31*a* cool-air introducing opening
32 second gas discharge duct part
33 protruding part
34 second cooling path
50 drip receiving container
60 packing
70 heat shield plate
90 object to be cooked
S electric component chamber

The invention claimed is:

1. A cooking device comprising:

a main body casing including at least one opening, a heating chamber which is provided in the main body casing and on which an internal gas discharge opening is provided, a gas discharge duct forming a gas discharge path, the gas discharge duct including a first gas discharge duct section provided inside of the main body casing and having one end thereof connected to the internal gas discharge opening on the heating chamber and a second gas discharge duct section partially provided inside the main body casing and having one end thereof connected to an external gas discharge opening, wherein a distal portion of the second gas discharge duct section passes through the main body casing and is structured and arranged above a top side of the main casing, the second gas discharge duct section including a bent section structured and arranged to bend around the main body casing from a back side to a top side thereof, an electric component chamber which is provided in the main body casing, a cooling fan which is provided in the main body casing and configured to cool electric components in the electric component chamber, an outside-air intake which is provided on the main body casing and through which outside air is taken, a cooling path which is formed inside the main body casing and which extends from the outside-air intake through the cooling fan and the electric component chamber to the at least one opening so as to provide a second cooling path that is separate from the gas discharge path formed by the gas discharge duct, the at least one opening being provided on the top side of the main casing facing towards and communicating with the second gas discharge duct section such that, during operation of the cooking device, cooling air travelling through the second cooling path is discharged from a blow-off opening at a distal end of the second cooling path, wherein the cooling air discharged from the blow-off opening flows along the top side of the main body casing and tends to separate discharge gas discharged from the external gas discharge opening from the top side of the main body casing to prevent condensation thereof, and heaters which are provided in the main body casing and configured to heat an inside of the heating chamber, wherein at least a portion of cooling air from the cooling fan flows along the cooling path, passes through spaces in vicinity of the heaters in the main body casing, flows into the gas discharge path through a cool-air introducing opening, and is discharged through the external gas discharge opening, wherein the cool-air introducing opening is provided upstream on the gas discharge path with respect to the external gas discharge opening.

2. The cooking device as claimed in claim 1, wherein the cooling air from the cooling fan flows along at least one side face of the heating chamber after passing through the electric component chamber and flows into the gas discharge path.

3. The cooking device as claimed in claim 1, further comprising heater chambers which are provided on a top side of the heating chamber and in which the heaters for heating the inside of the heating chamber are housed, wherein the cooling air from the cooling fan flows through the top side of the heating chamber along the heater chambers and flows into the gas discharge path.

* * * * *